US011639295B1

(12) United States Patent
Ruprecht

(10) Patent No.: US 11,639,295 B1
(45) Date of Patent: *May 2, 2023

(54) MULTI-STAGE FILTER ASSEMBLY

(71) Applicant: Tender Corporation, Littleton, NH (US)

(72) Inventor: John Ruprecht, Lakeland, MN (US)

(73) Assignee: TENDER CORPORATION, Littleton, NH (US)

( * ) Notice: Subject to any disclaimer, the term of this patent is extended or adjusted under 35 U.S.C. 154(b) by 209 days.

This patent is subject to a terminal disclaimer.

(21) Appl. No.: 17/145,676

(22) Filed: Jan. 11, 2021

Related U.S. Application Data

(63) Continuation of application No. 15/678,523, filed on Aug. 16, 2017, now Pat. No. 10,913,661.

(Continued)

(51) Int. Cl.
*B01D 27/14* (2006.01)
*B01D 29/00* (2006.01)
(Continued)

(52) U.S. Cl.
CPC .......... *C02F 1/002* (2013.01); *B01D 19/0031* (2013.01); *B01D 27/06* (2013.01);
(Continued)

(58) Field of Classification Search
CPC .............. C02F 1/002; C02F 2201/007; C02F 2307/02; C02F 1/003; C02F 9/005; C02F 2201/004; C02F 2201/006; B01D 29/21; B01D 29/58; B01D 19/0031; B01D 27/06; B01D 2201/4015; B01D 2201/40; B01D 2201/184; B01D 35/301; B01D 35/303; B01D 36/02; B01D 2201/309; B01D 2201/12; B01D 63/14; B01D 61/142; B01D 46/0013; B01D 46/0005; B01D 46/12; B01D 27/146; B01D 24/007; B01D 46/0023; B01D 29/0052; B01D 46/0026; B01D 33/41; B01D 29/56; B01D 2317/025; B01D 2319/025; B01D 46/0024; B01D 33/42; B01D 29/0059; B01D 27/148; B01D 29/114; B01D 29/15; B01D 29/33; B01D 33/0116; B01D 33/073; B01D 2033/07
See application file for complete search history.

(56) References Cited

U.S. PATENT DOCUMENTS 3,344,923 A * 10/1967 Silverwater .......... B01D 35/147
　　　　　　　　　　　　　　　　　　　210/90
2009/0166301 A1* 7/2009 Ringenberger ....... B01D 29/111
　　　　　　　　　　　　　　　　　　　210/232

(Continued)

*Primary Examiner* — Magali P Slawski
*Assistant Examiner* — Angel Olivera
(74) *Attorney, Agent, or Firm* — Mai D. Lauer; Westman, Champlin & Koehler P.A.

(57) ABSTRACT

In one aspect, a modular filter assembly for filtering fluid that flows in a flow direction therethrough is disclosed. The assembly includes a first housing section having a first filter element; a second housing section having a second filter element; and a connector disposed between the first and second housing sections. A housing includes the first housing section, the connector, and the second housing section. The flow direction is through the first and second filter elements in series.

20 Claims, 6 Drawing Sheets

Related U.S. Application Data

(60) Provisional application No. 62/377,738, filed on Aug. 22, 2016.

(51) Int. Cl.

| | | |
|---|---|---|
| *B01D 29/56* | (2006.01) | |
| *B01D 29/58* | (2006.01) | |
| *B01D 35/30* | (2006.01) | |
| *B01D 36/02* | (2006.01) | |
| *B01D 46/62* | (2022.01) | |
| *B01D 46/64* | (2022.01) | |
| *B01D 29/11* | (2006.01) | |
| *B01D 29/15* | (2006.01) | |
| *B01D 19/00* | (2006.01) | |
| *C02F 1/00* | (2006.01) | |
| *B01D 29/21* | (2006.01) | |
| *B01D 27/06* | (2006.01) | |
| B01D 24/00 | (2006.01) | |
| B01D 46/00 | (2022.01) | |
| B01D 46/12 | (2022.01) | |
| B01D 61/14 | (2006.01) | |
| B01D 63/14 | (2006.01) | |
| C02F 9/00 | (2006.01) | |
| B01D 33/42 | (2006.01) | |
| B01D 33/41 | (2006.01) | |
| B01D 29/33 | (2006.01) | |
| B01D 33/06 | (2006.01) | |
| B01D 33/01 | (2006.01) | |
| B01D 33/073 | (2006.01) | |

(52) U.S. Cl.
CPC .......... *B01D 27/146* (2013.01); *B01D 29/114* (2013.01); *B01D 29/15* (2013.01); *B01D 29/21* (2013.01); *B01D 29/58* (2013.01); *B01D 35/301* (2013.01); *B01D 35/303* (2013.01); *B01D 36/02* (2013.01); *B01D 24/007* (2013.01); *B01D 27/148* (2013.01); *B01D 29/0052* (2013.01); *B01D 29/0059* (2013.01); *B01D 29/33* (2013.01); *B01D 29/56* (2013.01); *B01D 33/0116* (2013.01); *B01D 33/073* (2013.01); *B01D 33/41* (2013.01); *B01D 33/42* (2013.01); *B01D 46/0005* (2013.01); *B01D 46/0013* (2013.01); *B01D 46/12* (2013.01); *B01D 46/62* (2022.01); *B01D 46/64* (2022.01); *B01D 46/645* (2022.01); *B01D 61/146* (2022.08); *B01D 63/14* (2013.01); *B01D 2033/07* (2013.01); *B01D 2201/12* (2013.01); *B01D 2201/184* (2013.01); *B01D 2201/309* (2013.01); *B01D 2201/40* (2013.01); *B01D 2201/4015* (2013.01); *B01D 2265/022* (2013.01); *B01D 2317/025* (2013.01); *B01D 2319/025* (2013.01); *C02F 1/003* (2013.01); *C02F 9/005* (2013.01); *C02F 2201/004* (2013.01); *C02F 2201/006* (2013.01); *C02F 2201/007* (2013.01); *C02F 2307/02* (2013.01)

(56) References Cited

U.S. PATENT DOCUMENTS

2015/0101295 A1* 4/2015 Thompson ........... B01D 35/153
  55/482
2020/0139271 A1* 5/2020 Schmitt ................. B01D 29/58

* cited by examiner

MULTI-STAGE FILTER ASSEMBLY

CROSS-REFERENCE TO RELATED APPLICATION

This application is a continuation of U.S. patent application Ser. No. 15/678,523, filed Aug. 16, 2017, which claims the benefit of priority from U.S. Provisional Patent Application Ser. No. 62/377,738 filed on Aug. 22, 2016 and entitled "Multi-Stage Filter Assembly;" these priority applications are a hereby incorporated by reference in their entireties.

BACKGROUND

Water borne diseases in humans can result from water-related recreational activities such as swimming, boating and other water sports as well as through ingestion of contaminated water by drinking. Such diseases may be caused by bacteria, viruses, other pathogens, and chemicals. Moreover, water encountered in the outdoors may contain undesirable contaminants from organic material such as algae, protozoa and mold, and inorganic materials such as sediment, for example.

Accordingly, while participating in outdoor activities or otherwise distant from a clean source of reliable drinking water, participants wishing to drink water from streams, lakes, rivers and other bodies of water conventionally carry portable filters and/or chemical disinfectants. Many of the current state of the art devices for making available water potable have drawbacks. Some systems are slow, and some systems require squeezing of water through a device in order to obtain the requisite pressure gradient for effective containment removal, thereby making water treatment a labor-intensive process. Some chemical systems may leave residual undesirable tastes and potentially hazardous levels of chemicals in the treated water. Yet other systems use filters that plug up quickly, requiring frequent filter changes, as well as necessitating that the user carry many filter replacements and carry the used filters for proper disposal. Moreover, many state-of-the-art filters are not effective at removing viruses, which are so small that they pass through many filter media so that even the treated water remains potentially hazardous.

SUMMARY

In one aspect, a modular filter assembly for filtering fluid that flows in a flow direction therethrough is disclosed. The assembly includes a first housing section including a first filter element; a second housing section including a second filter element; and a connector disposed between the first and second housing sections. A housing includes the first housing section, the connector, and the second housing section. The flow direction is through the first and second filter elements in series.

This disclosure, in its various combinations, either in apparatus or method form, may also be characterized by the following listing of items:
1. A modular filter assembly for filtering fluid that flows in a flow direction therethrough, the assembly including:
   a first housing section including a first filter element;
   a second housing section including a second filter element; and
   a connector disposed between the first and second housing sections;
   wherein a housing includes the first housing section, the connector, and the second housing section; and
   wherein the flow direction is through the first and second filter elements in series.
2. The assembly of item 1, wherein a portion of the flow direction is from a space between a wall of the first housing section and the first filter element to a core of the first filter element.
3. The assembly of any of items 1-2, wherein a wall of the first housing section is transparent.
4. The assembly of any of items 1-3, wherein the first filter element includes a pleated filter media.
5. The assembly of any of items 1-4, wherein the pleated filter media possesses a cationic charge potential when wet.
6. The assembly of any of items 1-5, wherein the first housing section is attachable and detachable from the connector without tools.
7. The assembly of any of items 1-6, wherein the connector is detachably connected to a base of the first filter element.
8. The assembly of any of items 1-7, wherein the first housing section includes an upper portion and a lower portion that are detachably connected to each other.
9. The assembly of any of items 1-8, wherein the first filter element is configured to retain larger particles than the second filter element.
10. The assembly of any of items 1-9, wherein the first filter element is configured to retain different types of contaminants than the second filter element.
11. The assembly of any of items 1-10, wherein the first filter element and the second filter element have different lengths.
12. The assembly of item 11 wherein the first housing section and the second housing section have different lengths.
13. The assembly of any of items 1-12, wherein the connector further includes a wall separating the first housing section and the second housing section.
14. The assembly of any of items 1-13, wherein the connector further includes a nipple configured for attachment to the first filter element.
15. The assembly of any of items 1-14, further including a twist-lock mechanism at an interface between the first housing section and the connector.
16. The assembly of any of items 1-15, further including a sealing element at an interface between the second housing section and the connector.
17. The assembly of any of items 1-16, further including a filter locator configured for engagement with the second filter element.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

Figure 1:
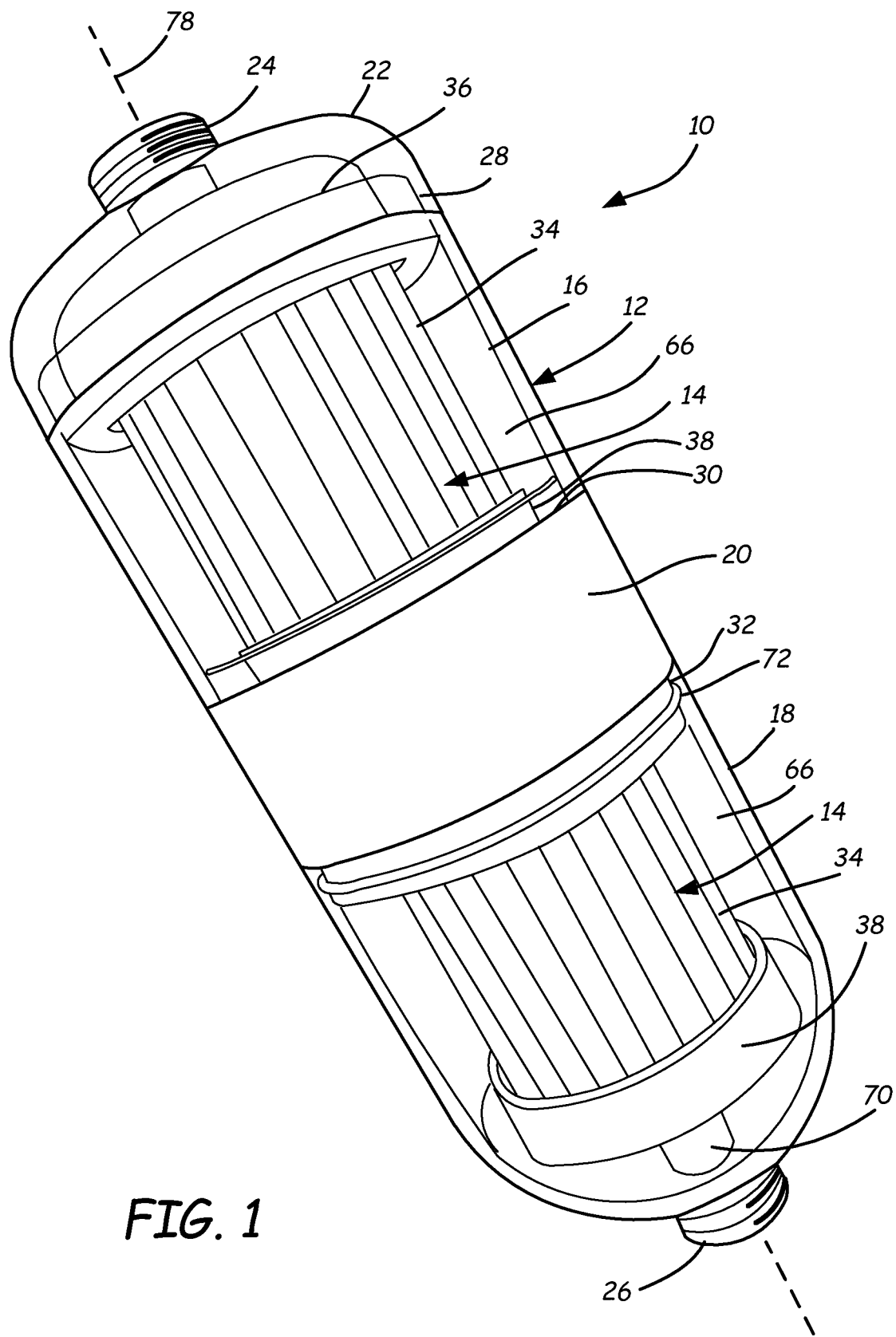
FIG. 1 is a perspective view of a first exemplary filter assembly of the present disclosure.

FIG. 1 is a perspective view of a first exemplary embodiment of a modular, multi-stage water filter assembly 10. Filter assembly 10 includes a housing 12 that is modular and in an exemplary embodiment is made of a durable, transparent or translucent material so that a condition of filter elements 14 within the housing 12 can be visually assessed. Housing 12 in an exemplary embodiment is made of a material that is free of Bisphenol-A (BPA) to alleviate concerns about possible adverse health effects from BPA.

In the embodiment of filter assembly 10 illustrated in FIG. 1, upper housing section 16 includes lid 22 having inlet port 24 for connection to a water source. Lower housing section 18 has outlet port 26 for connection to a filtered water reservoir. Lid 22 in an exemplary embodiment is removably attached to upper housing section 16 at interface 28. In an exemplary embodiment, a twist-lock closure mechanism is provided at interface 28 to allow for quick removal of lid 22 from upper housing section 16, while insuring a quick yet reliable closure of lid 22 on upper housing section 16. In an exemplary embodiment, such twist-lock closure mechanisms are operable manually, without the use of tools, and include sealing elements such as gaskets or O-rings. In an exemplary embodiment, such a twist lock closure is also provided at interface 30 between upper housing section 16 and connector 20 and at interface 32 between lower housing section 18 and connector 20. While a particular embodiment of a twist lock closure is discussed and illustrated, it is to be understood that other attachment mechanisms can also be used, such as conventional threaded means, for example.

In an exemplary embodiment, each housing section 16, 18 contains a separate filter element 14. Thus, each housing section 16, 18 acts as an individual filtering stage, with water flowing through the housing sections 16, 18 in series (and thus flowing through the corresponding filtering stages in series). In an exemplary embodiment, multiples stages of water filtering are thus provided in a single, compact housing 12.

In an exemplary embodiment, each filter element 14 includes a pleated filter media 34 disposed between cap 36 and base 38. In an exemplary embodiment, filter media 34 is made using a wet-laid, non-woven manufacturing method to produce a highly engineered filter paper that has a mean pore size of about 1.75 microns. The mineral pseudoboehmite is embedded into this filter medium to generate an electric charge field so that the medium is an electroabsorbtive filter having a strong positive or cationic charge potential. The media itself has an electrokinetic potential that when wet, naturally generates a charge field that has an effective range of more than one micron. Accordingly, the entire void volume of the media is covered by the charge field. When water passes from one side of the media through the filter to the other side, particles within the water make their way through a tortuous path by traveling through approximately 400 layers of fibers and pores. Particles having a size of greater than about 1.75 microns are physically retained by the media. Moreover, many organic and inorganic sub-micron particles in water having a pH between about 6.2 and 8.0 have some degree of negative charge on their surface. These sub-micron particles are effectively removed from the traveling water by the positive charge of the media 34.

Once the contaminants are absorbed onto the media 34, they are permanently retained. If the filter is back washed or agitated in water, the debris that comes off the filter generally consists of particles greater than one micron that were mechanically or physically removed by the media. However, the particles that are electrically absorbed onto the media cannot be removed through simple rinsing. Accordingly, filter elements 14 should be removed from housing 12 and discarded as they become plugged to the extent that water does not flow through the filter elements 14 readily when set up, as will be discussed below. Suitable filter elements are commercially available from RapidPure Inc. of Lakeland, Minn. under model names UltraCeram™, Explorer™, Scout™, and TrailBlazer™, for example.

Figure 2:
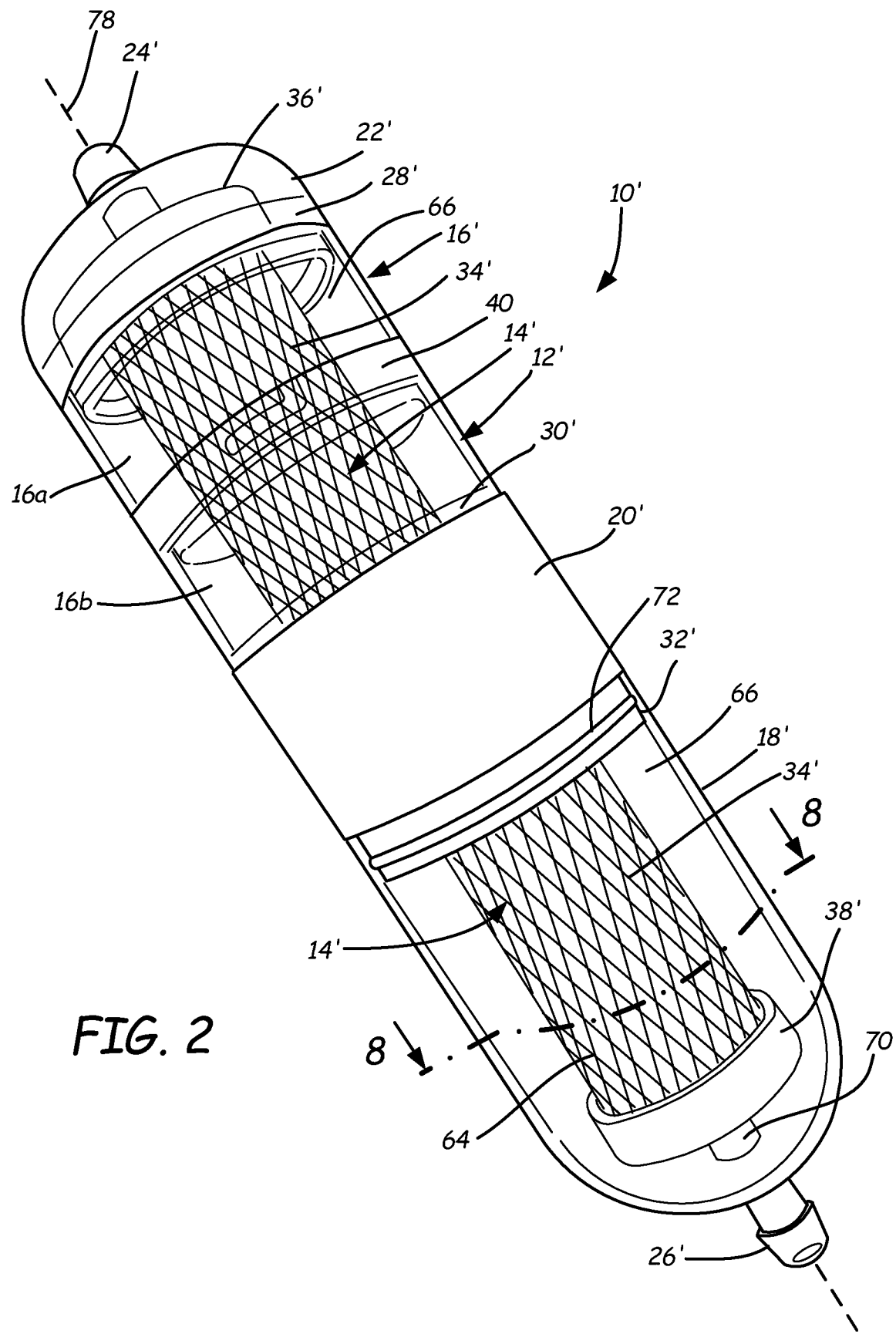
FIG. 2 is a perspective view of a second exemplary embodiment of a filter assembly.

FIG. 2 shows a second exemplary embodiment of a multi-stage water filter assembly 10'. Filter assembly 10' is similar to filter assembly 10 but is generally smaller in size (e.g., diameter) and has some configuration differences. However, in this disclosure, discussion of similarly numbered parts will refer to the versions designated with and without the prime markings, unless differences are specifically noted. Moreover, while each of filter assemblies 10, 10', and 10" (FIG. 3) is described as illustrated, it is to be understood that descriptions relevant to one can also be incorporated into the others, even if not explicitly shown or discussed.

As shown in FIG. 2, upper housing section 16' itself has upper portion 16a and lower portion 16b that are connected at interface 40. In an exemplary embodiment, a twist-lock closure is provided at interface 40, which can be similar to the component interfaces described with respect to filter assembly 10 above. Thus, two or more portions 16a and 16b can be connected together to provide for different lengths for upper housing section 16'. Accordingly, it is quick and easy to modify filter assembly 10' to accommodate filter elements 14' of different lengths (along longitudinal axis 78). Increasing the filter element surface area thus increases the filtering capacity of assembly 10'.

FIG. 2 also shows a wrap 64 provided on each filter element 14' on an outside of pleated filter media 34'. In an exemplary embodiment, wrap 64 serves as a pre-filter to block the passage of large particles from flowing to pleated filter media 34'. This extends the longevity of the filter elements 14'. Moreover, while upper housing section 16' is illustrated with two portions 16a and 16b, it is to be understood that any housing section may be composed of two or more portions.

In FIGS. 1 and 2, multi-stage water filter assemblies 10 and 10' each show two stages: the first stage is in upper housing section 16, 16'; the second stage is in lower housing section 18, 18'. However, it is to be understood that a multi-stage water filter assembly of the present disclosure can have two or more housing sections separated by a connector such as connector 20, 20'.

Figure 3:
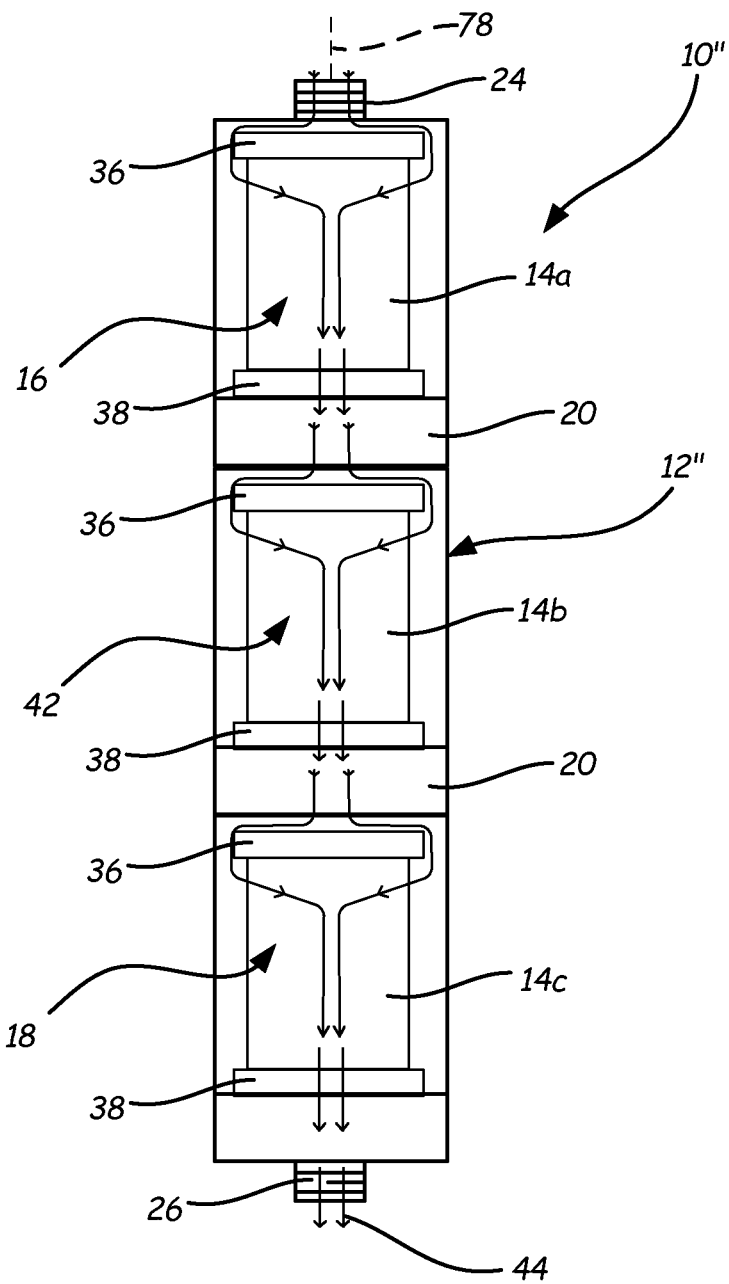
FIG. 3 is a schematic drawing showing flow through an exemplary filter assembly.

FIG. 3 is a schematic view of a three-stage water filter assembly 10", including upper housing section 16, lower housing section 18, and intermediate housing section 42. Arrows 44 indicate the flow direction of water through filter assembly 10". In an exemplary embodiment, upper housing section 16 includes a coarse filter 14a for the reduction of sediment and particulates such as sand, dirt, rust and other particles having a size of about 30 or more microns. In an exemplary embodiment, intermediate housing section 42 has a filter element 14b for the reduction of chlorine and adverse tastes and odors due to organic and inorganic material. Such examples of organic materials include Atrazine, Benzene, Chlorine, Fluorine, Bromine and Iodine. Examples of such inorganic materials include Arsenic, Cadmium, Chromium, Zinc, Lead, Mercury and Copper. In an exemplary embodiment, lower housing section 18 includes a filter element 14c for the reduction of microorganisms and disinfectant byproducts. Examples of such microorganisms include cysts; bacteria such as *E. coli* and *Legionella*; turbidity and viruses. Examples of disinfectant byproducts also reduced by the filter element in lower housing section 18 include Trihalomethanes, Bromate and Chlorite.

Referring to FIGS. 1-3 and 8, in exemplary embodiments, a flow of water in direction 44 is inward through each filter element 14. Thus, water introduced into filter assembly 10 through inlet port 24 flows into the space 66 between filter element 14 and the wall of housing 12. The water flows through pleated filter media 34 to the core 68 of filter element 14; from this core 68, the filtered water flows downward through outlet 70 to the next housing section or out of the assembly's lower housing section though outlet port 26.

Accordingly, when walls of housing 12 are made of a transparent material, a user can visually assess a condition of a filter element 14 by looking at the amount of sediment, particulates and other matter retained on filter media 32. By visually assessing a condition of each filter element 14 and considering the flow rate of water through filter assembly 10, a user can determine when the filter element 14 in each of the housing sections should be replaced. Providing multiple stages of filtration in the discreet housing sections 16, 42 and 18 permits a user to replace just a single filter element 14 if the filter elements 14 in other housing sections are still useable. Often, the filter element 14a in the upper housing section 16 will require replacement before the other filter elements 14b, 14c, as upper housing section 16 retains most of the sediment and particulates that quickly clog up a filter element. In some embodiments, each of the filter elements 14 in each of the sections 16, 42 and 18 is the same. However, in other embodiments, upper housing section 16 can use a more economical coarse filter 14a; intermediate housing section 42 can use a different type of filter 14b for removing organics and inorganics; and lower housing section 18 can use a more sophisticated, and thus generally more expensive, fine filter 14c for microorganisms and disinfectant byproducts. Thus, a user can extend the life of the more expensive fine filters by removing the coarser particulates in a previous stage or housing section, to prevent plugging of the finer filters by those particulates.

Figure 4:
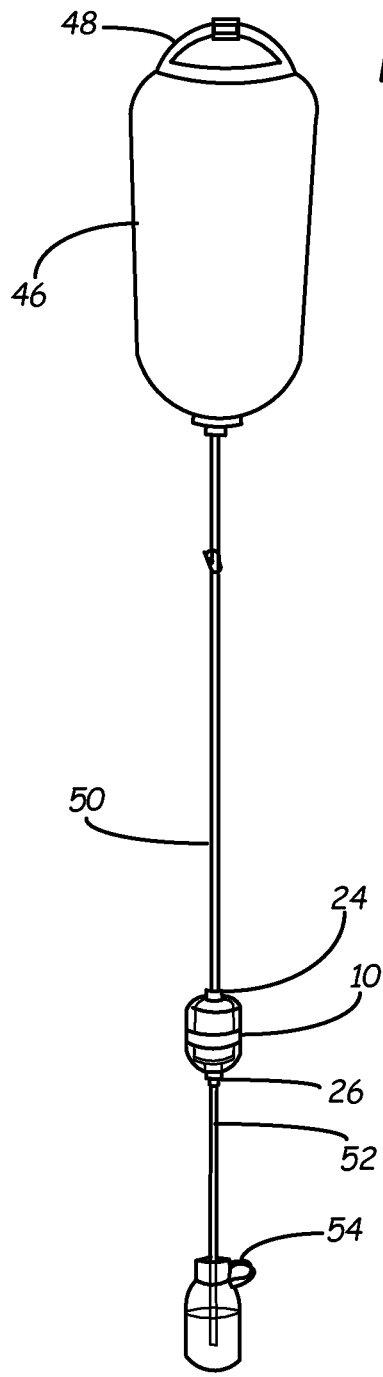
FIG. 4 is a view of a first exemplary arrangement for use of a disclosed filter assembly.

FIG. 4 is a perspective view of a first arrangement for use of filter assembly 10. As shown in FIG. 4, reservoir 46 contains a supply of water to be treated by filter assembly 10. As illustrated, reservoir 46 is in a form of a waterproof bag, but it can take other forms such as a bucket or other container, for example. In an exemplary method of use, a user fills reservoir 46 with water from an available source such as, for example, a lake, river or stream. To provide a pressurized flow to filter assembly 10, the user positions reservoir 46 at a higher elevation than filter assembly 10, so that the water in the reservoir 46 flows downwardly with a pressurized flow due to gravity. In one embodiment, reservoir 46 has means such as one or more straps or fasteners 48 to allow reservoir 46 to be suspended from a tree limb, for example. Water from reservoir 46 flows through conduit 50 to inlet port 24 of filter assembly 10. After passing through filter assembly 10, the filtered water then exits filter assembly 10 through outlet port 26 and conduit 52 to a storage vessel 54, such a water bottle for example.

Figure 5:
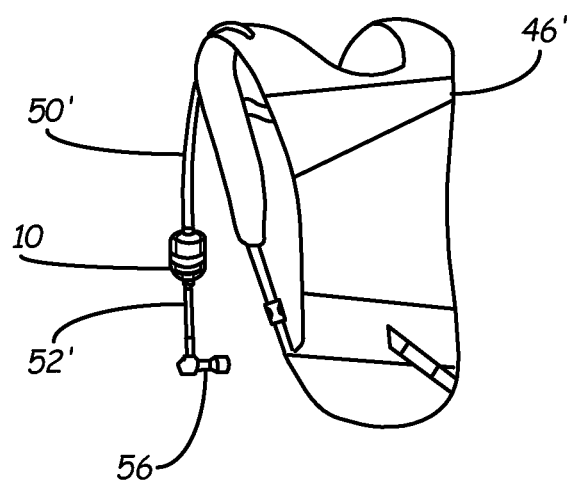
FIG. 5 is a view of a second exemplary arrangement for use of a disclosed filter assembly.

FIG. 5 shows an embodiment of a reservoir 46' in the form of a backpack that can be worn by the user. Water flows from a container within reservoir 46' through conduit 50' and to and through filter assembly 10. Water exits filter assembly 10 through conduit 52' to an outlet such as nozzle 56, which in an exemplary embodiment can be selectively opened and closed by a user. While two exemplary arrangements for the use of filter assembly 10, 10' are shown in FIGS. 4 and 5, it is contemplated that other arrangements can also be employed using reservoirs, conduits, and vessels or outlets of other configurations and positions.

Figure 6:
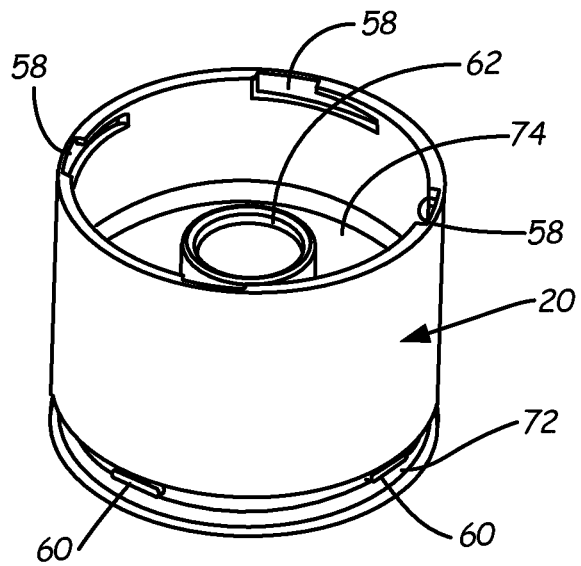
FIG. 6 is a top perspective view of an exemplary connector for connecting two stages of the filter assemblies.
Figure 7A:
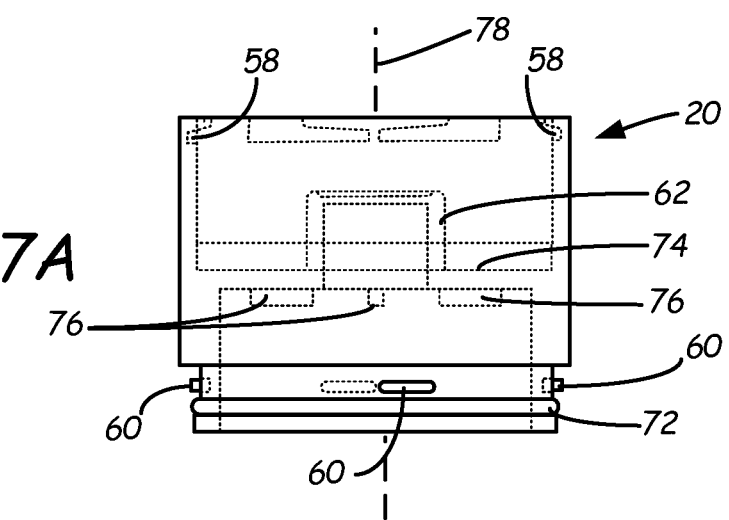
FIG. 7A is a side elevation view of the connector of FIG. 6.
Figure 7B:
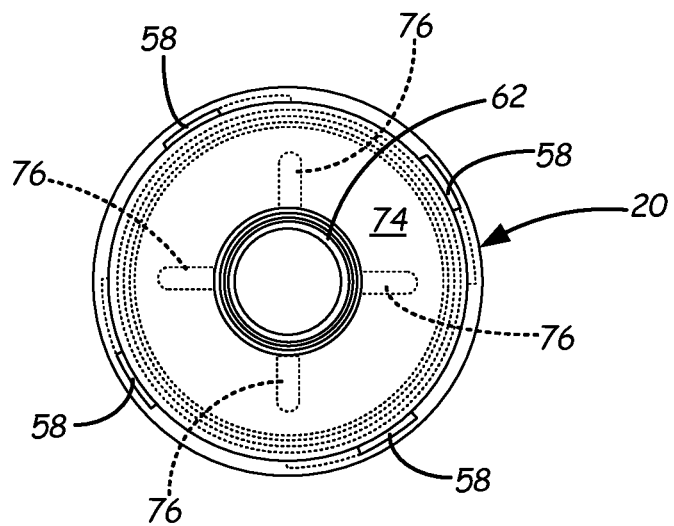
FIG. 7B is a top view of the connector of FIG. 6.
Figure 8:
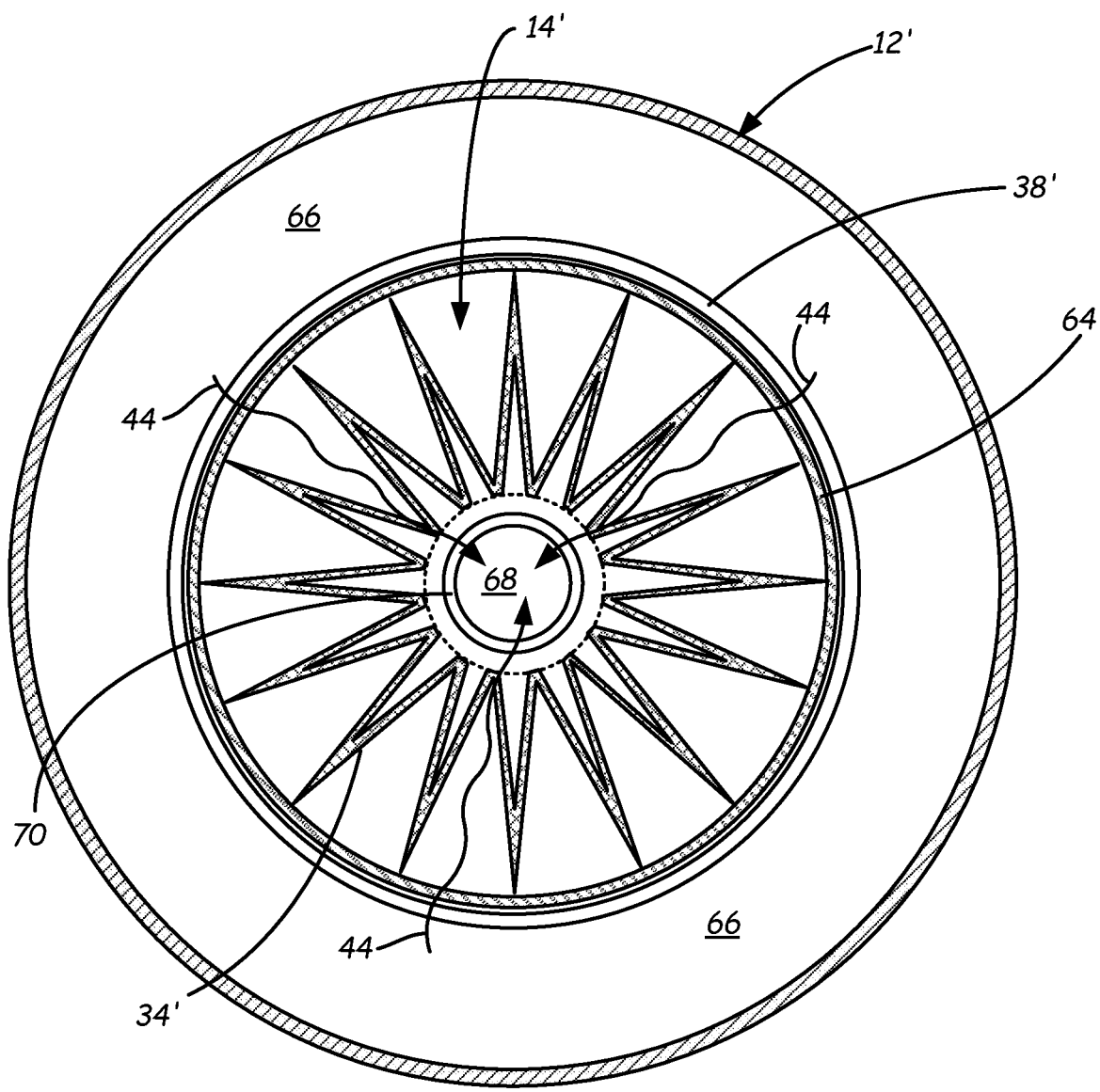
FIG. 8 is a cross-sectional view taken along line 8-8 of FIG. 2.

FIG. 6 is a top perspective view of an exemplary connector 20 for use in attaching any two housing sections 16, 18, 42 to each other. FIG. 7A is a side elevation view of connector 20, and FIG. 7B is a top view of connector 20. Connector 20 includes interior twist-lock mechanisms 58 and exterior twist-lock mechanisms 60 to detachably couple to complimentary mechanisms of housing sections 16, 18, 42 and a sealing element such as o-ring 72. Connector 20 includes wall 74 to separate connected housing sections, such as housing sections 16, 42, or 18.

Connector 20 in an exemplary embodiment includes nipple 62, which communicates with a core 68 (see FIG. 8) of filter element 14 so that filtered water within the core 68 of filter element 14 passes downward by gravity through outlet 70 to the next housing section 42 or 18. Thus, the water filtered through one of the housing sections 16, 42 passes to the next housing section, where it flows inward through filter element 14 from an area 66 between the filter element 14 and the housing 12. In an exemplary embodiment, outlet 70 (see FIGS. 2 and 8) of base 38 of filter element 14 is attached to nipple 62 in a detachable manner, such as by a threaded connection, a twist-lock connection, for frictional engagement, for example.

In an exemplary embodiment, connector 20 includes a plurality of filter locators 76 for engagement with cap 36 of a filter element 14 in intermediate housing section 42 or lower housing section 18. In the illustrated embodiment, filter locators 76 are formed as four equally spaced, radial spokes extending downward from wall 74. However, it is contemplated that filter locators 76 may be provided with different configurations and in different numbers. In an exemplary embodiment, a nipple of cap 36 fits in a space between the filter locators 76 to maintain the filter element 14 in a centered orientation relative to the walls of housing 12.

While particular embodiments are illustrated, it is to be understood that filter assembly 10 can be rendered in a wide variety of sizes with any number of two or more housing sections (e.g. sections 16, 42, 18) to allow for staged filtering of a fluid such as water. For example, FIGS. 1 and 2 show a 2-stage filter assembly 10, 10', while FIG. 3 shows a 3-stage filter assembly 10''. It is contemplated that a filter assembly could alternatively be a 4-stage filter assembly, a 5-stage filter assembly, or have any number of stages. In an exemplary embodiment, each stage of the filter assembly is enclosed in a separate housing section. Thus, filter assembly 10 offers a compact, multi-stage filtering assembly that is especially useful when a portable apparatus is desired such as for camping, backpacking, and military use, for example. The modular connection of housing sections 16, 18 and 42 through the use of connectors 20 offers multiple stages of filtering in a single housing 12. In each of these stages or housing sections, the filter assembly 14 can be individually replaced as needed.

Thus, a filtering assembly 10 is provided wherein multiple stages of filtering are accomplished without manifolds, tubing or other complicated connections between the filtering stages. Water flows through each of the stages, and thus each of the filter elements 14, in series; additional connectors 20 and housing sections can be added to make an assembly having three stages of filtering, four stages of filtering, or any number of stages desired by the user. Moreover, while the illustrated embodiments show filter elements 14 having approximately the same length in each of the housing sections corresponding to individual filtering stages, it is to be understood that filter elements of different lengths can also be used within differently sized housing sections of a single filter assembly.

Moreover, while a particular construction of filter element 14 has been described, it is contemplated that the filter elements of a multi-stage filter assembly can be different from that described. Moreover, the filter element in one housing section may be of different construction than a filter element in another housing section. Another suitable type of filter element includes, for example, a granular activated carbon (GAC) filter, in which a raw organic material that is high in carbon (such as coconut shells or coal, for example) is activated by heat, in the absence of oxygen, to increase the surface area of the carbon. The activated carbon removes certain chemicals that are dissolved in water, such as hydrogen sulfide and chlorine, by adsorption. Other suitable filter element types include wound cloth filters and resin media filters, for example.

Additionally, a flow restrictor (not shown) may be added to any housing section to control the contact time of fluid being treated in the respective housing section. Also, while the disclosure refers primarily to water as the fluid being treated in a multi-stage filter assembly, many other fluids can also be filtered and treated by the disclosed filter assembly.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. A method of filtering fluid through an assembly that defines a liquid passage flow direction, the method comprising, in series:
    passing the fluid through an inlet to a first housing section;
    passing the fluid to an outside of a first filter element having a first core, the first filter element disposed in the first housing section;
    passing the fluid through the first filter element to the first core;
    passing the fluid through a nipple connected to the first core, the nipple being in fluid communication with a second housing section;
    passing the fluid to an outside of a second filter element having a second core, the second filter element disposed in the second housing section;
    passing the fluid through the second filter element to the second core; and
    passing the fluid through an outlet;
    wherein the inlet, the first housing section, the nipple, the second housing section, and the outlet are aligned in series along a longitudinal axis of the assembly.

2. The method of claim 1 wherein the nipple is disposed on a first connector, the method comprising detaching the first connector from the first housing section.

3. The method of claim 1 wherein detaching the connector from the first housing section comprises twisting the connector relative to the first housing section.

4. The method of claim 2 comprising removing the first filter element from the first housing section for replacement of the first filter element.

5. The method of claim 2 comprising detaching the connector from the second housing section.

6. The method of claim 5 wherein detaching the connector from the second housing section comprises twisting the connector relative to the second housing section.

7. The method of claim 5 comprising removing the second filter element from the second housing section for replacement of the second filter element.

8. The method of claim 5 comprising reattaching the connector to the second housing section, including aligning the nipple with the second filter element using a plurality of radial filter locating spokes.

9. The method of claim 1 wherein the first filter element retains particles of an average first size and the second filter element retains particles of an average second size that is smaller than the average first size.

10. The method of claim 1 wherein the first filter element retains a first type of contaminant and the second filter element retains a second type of contaminant that is different from the first type of contaminant.

11. The method of claim 1, further comprising:
    fluidly connecting an intermediate housing section between the first and second housing sections, the intermediate housing section comprising a third filter element;
    wherein the flow direction is through the first filter element and the third filter element and the second filter element in series; and
    wherein the inlet, the first housing section, the intermediate housing section, the second housing section, and the outlet are aligned in series along the longitudinal axis of the assembly.

12. The method of claim 1, comprising providing a prefilter wrap around at least one of the first filter element and the second filter element, wherein the flow direction is through the prefilter wrap before passing through the first filter element to the first core.

13. The method of claim 1, comprising moving the fluid from a reservoir and through the inlet.

14. The method of claim 13, comprising pressurizing the fluid to move the fluid from the reservoir through the inlet.

15. The method of claim 14, comprising elevating the reservoir relative to the inlet to pressurize the fluid using gravity.

16. The method of claim 13, comprising suspending the reservoir at a higher elevation than the inlet.

17. The method of claim 1, comprising connecting a conduit to the outlet.

18. The method of claim 17, comprising directing fluid from the conduit to a vessel.

19. The method of claim 17, comprising directing fluid from the conduit to a nozzle.

20. The method of claim 1, comprising adding a flow restrictor to at least one of the first and second housing sections.

\* \* \* \* \*